US005146250A

United States Patent [19]

Sakamoto et al.

[11] Patent Number: 5,146,250

[45] Date of Patent: Sep. 8, 1992

[54] EXTERNAL POWER SOURCE FOR ELECTRONIC FLASH

[75] Inventors: Hiroshi Sakamoto, Kawasaki; Nobuyoshi Hagiuda, Yokohama, both of Japan

[73] Assignee: Nikon Corporation, Tokyo, Japan

[21] Appl. No.: 650,873

[22] Filed: Feb. 5, 1991

[30] Foreign Application Priority Data

Feb. 14, 1990 [JP] Japan ........................ 2-33511

[51] Int. Cl.[5] ........................ G03B 15/05

[52] U.S. Cl. ........................ 354/145.1; 354/147; 315/241 P

[58] Field of Search ........................ 354/145.1, 147; 315/241 P

[56] References Cited

U.S. PATENT DOCUMENTS 4,430,602 2/1984 Ohmori ........................ 354/145.1 X

*Primary Examiner*—Michael L. Gellner
*Attorney, Agent, or Firm*—Shapiro and Shapiro

[57] ABSTRACT

An external power source, for an electronic flash unit, includes a battery, a voltage step-up circuit for starting a voltage step-up operation of the battery voltage in response to a start signal and terminating the step-up operation in response to a stop signal, a voltage detecting circuit for detecting that the output voltage of the voltage step-up circuit has reached a predetermined value, and a voltage step-up control circuit for releasing the start signal and the stop signal. The control circuit releases the start signal in response to a synchronization signal from the camera or in response to the detection of flash emission by a flash detecting circuit, and releases the stop signal upon detection by the detecting circuit that the output voltage has reached the predetermined value.

6 Claims, 5 Drawing Sheets

EXTERNAL POWER SOURCE FOR ELECTRONIC FLASH

BACKGROUND OF THE INVENTION

1. Field of the Invention

The present invention relates to an external power source for an electronic flash unit for use in a camera.

2. Related Background Art

As the external power source for an electronic flash unit for use in a camera, there have been used various types such as a high-voltage piled battery, or a DC-DC converter for obtaining a high voltage from a small low-voltage battery.

However, the piled battery conventionally used as the external power source for the electronic flash unit is poor in portability because of its bulkiness and large weight, and is expensive, giving economic burden to the user.

On the other hand, the power source utilizing voltage elevation by the DC-DC converter from a small low-voltage battery is free from the above-mentioned drawbacks of the piled battery, but is associated with wasted current because of the continued voltage elevating operation of the DC-DC converter, so that the life of the battery is shortened if the power supply is turned on for a long time.

SUMMARY OF THE INVENTION

An object of the present invention is, in an external power source utilizing voltage elevation by a DC-DC converter from a small low-voltage battery for an electronic flash unit, to start and stop the voltage step-up operation of the DC-DC converter according to the necessity, thereby preventing unnecessary consumption of the power of the battery and extending the service life thereof.

In an aspect of the present invention, the external power source of the present invention for electronic flash is provided, as shown in FIG. 1, with a battery 10; voltage step-up means 20 for starting or stopping the step-up operation of the battery voltage by a start or stop signal; voltage detecting means 40 for detecting than the output voltage of the voltage step-up means 20 reaches a predetermined value; and voltage step-up control means 60 for releasing a start signal in response to a synchronization signal for flash emission from the camera and a stop signal in response to the detection by the voltage detecting means 40 that the output voltage has reached the predetermined value. In response to a synchronization signal supplied from the camera, the voltage step-up control means 60 activates the voltage step-up means 20 to start the step-up operation of the battery voltage, thereby charging a main capacitor of the electronic flash unit connected to the external power source. When the terminal voltage of the main capacitor reaches a predetermined value, the voltage detecting means 40 is activated to send a stop signal to the voltage step-up control means 60, which in response terminates the voltage step-up operation of the voltage step-up means 20.

Eventually a voltage step-up start signal may be sent to the voltage step-up control means 60 in synchronization with the flash emission synchronous with the leading shutter blind or trailing shutter blind, thereby activating the voltage step-up means 20 and initiating the voltage step-up operation.

In a second aspect of the present invention, the external power source of the present invention is composed, as shown in FIG. 6, of a battery 10; voltage step-up means 20 for starting or stopping the step-up operation of the battery voltage by a start or stop signal; flash detecting means 80 for detecting flash emission by the electronic flash unit; voltage detecting means 40 for detecting that the output voltage of the voltage step-up means 20 reaches a predetermined value; and voltage step-up control means 60A for releasing a start signal upon detection of the flash emission by the flash detecting means 80 and a stop signal in response to the detection by the voltage detecting means 40 that the output voltage has reached the predetermined value. When the flash detecting means 80 detects the flash emission by the electronic flash unit, the voltage step-up control means 60 activates the voltage-step-up means 20 to start the voltage step-up operation.

As explained in the foregoing, the present invention allows effecting the voltage step-up operation only during the charging of the main capacitor of the electronic flash unit, while only the circuits of extremely low power consumption such as the voltage detecting circuit and the voltage step-up control circuit are powered when charging is not conducted. It is therefore rendered possible to prevent unnecessary consumption of the battery and to extend the service life thereof.

In the foregoing description, there have been utilized the drawings of embodiments of the present invention for the purpose of clarity, but it is to be understood that the present invention is not limited to such embodiments.

DETAILED DESCRIPTION OF THE PREFERRED EMBODIMENTS

First Embodiment

Figure 1:
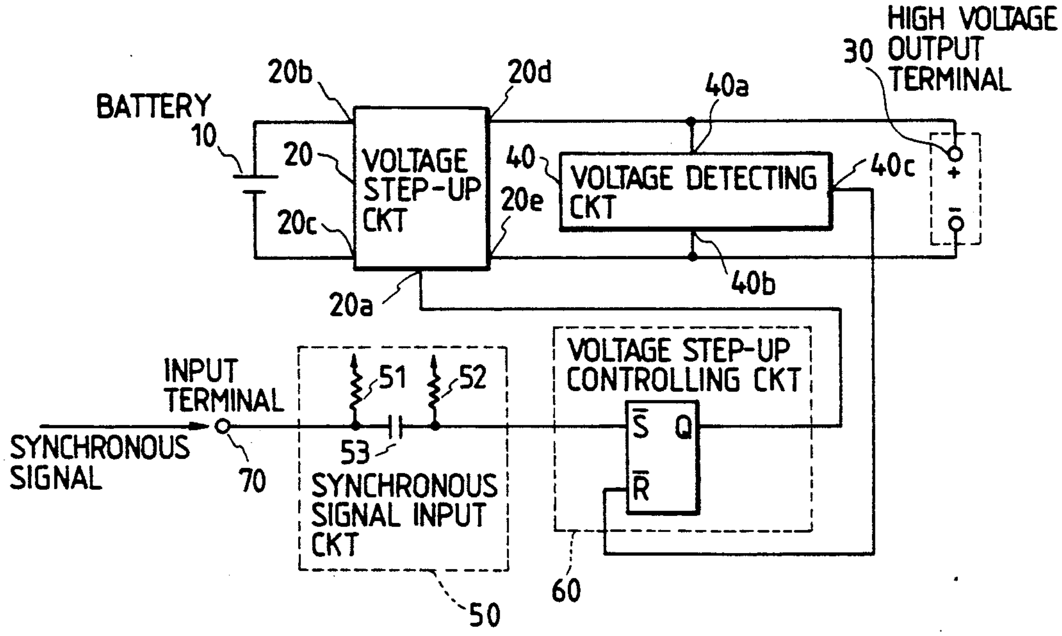
FIG. 1 is a block diagram of a first embodiment of the external power source for electronic flash.

FIG. 1 is a block diagram of a first embodiment of the external power source of the present invention, for an electronic flash unit.

A battery 10 used as the power source is composed, for example, of a serial connection of several compact UM-3 batteries. A voltage step-up circuit (DC-DC converter) 20 for elevating the terminal voltage of the battery 10 to a high voltage is for example constructed as shown in FIG. 2.

Figure 2:
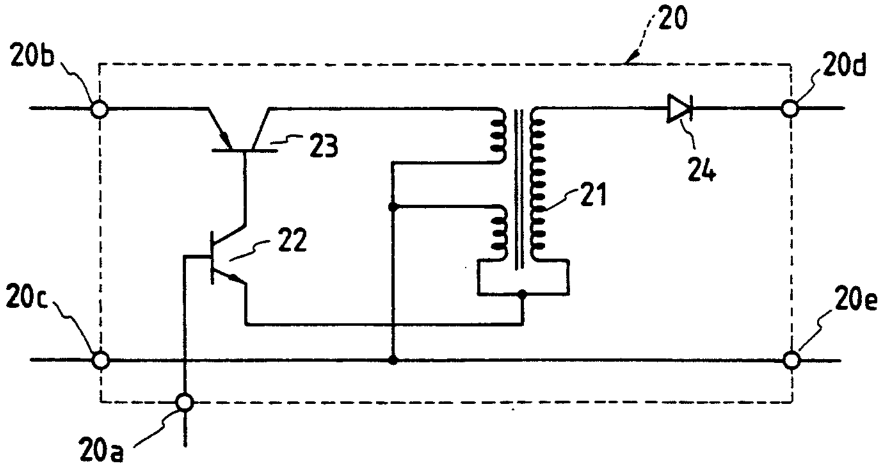
FIG. 2 is a detailed circuit diagram of a voltage step-up circuit thereof.

As shown in FIG. 2, the circuit is composed of a step-up transformer 21, two transistors 22, 23 and a diode 24. When a control terminal 20a shifted to a high-level state, the transistor 22 is turned on to turn on the transistor 23, whereby the battery terminal voltage applied between input terminals 20b, 20c is stepped up by the transformer 21 thereby providing an elevated voltage between output terminals 20d, 20e. Consequently the voltage step-up operation is terminated when the transistor 22 is turned off, thereby eliminating unnecessary current from the battery.

Figure 3:
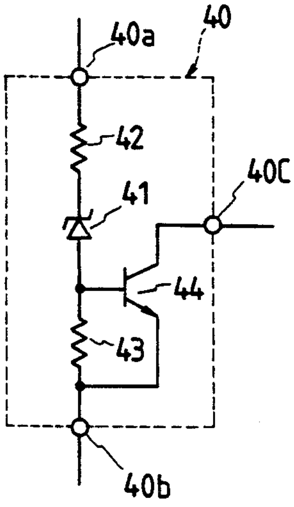
FIG. 3 is a detailed circuit diagram of a voltage detecting circuit thereof.

High-voltage output terminals 30, connected to an electronic flash unit (not shown), are connected to the output terminals 20d, 20e of the voltage step-up circuit 20. A voltage detecting circuit 40 is composed, as shown in FIG. 3, of a Zener diode 41, two resistors 42, 43 and a transistor 44. When a voltage exceeding a predetermined value is applied between terminals 40a, 40b, the transistor 44 is turned on to provide a low-level signal at an output terminal 40c.

There are also provided a synchronization signal input circuit 50, and a voltage step-up control circuit 60. The synchronization signal input circuit 50 is composed of pull-up resistors 51, 52 and a capacitor 53, and is inserted between a synchronization signal input terminal 70 and a set input port S of the voltage step-up control circuit 60.

The voltage step-up control circuit 60 is composed of a latch circuit of which output Q assumes a high-level state or a low-level state respectively when a set input $\bar{S}$is in a low-level state or a reset input $\bar{R}$is in a low-level state, and output Q is connected a control terminal 20a of the above-explained voltage step-up circuit 20. Also, reset input port $\bar{R}$is connected to the output terminal 40c of the voltage detecting circuit 40.

The above-explained external power source of the present invention is connected to power supply terminals of an electronic flash unit through the high-voltage output terminals 30 for supplying the main capacitor of the flash unit with a high DC voltage, and is connected to a synchronization signal contact terminal of the camera through the synchronization signal input terminal 70, whereby the voltage step-up circuit 20 is activated or deactivated in synchronization with the synchronization signal for synchronizing the flash light emission with the fully open state of the shutter. The synchronization signal input terminal 70 may also be connected to an extension synchronization signal terminal provided on the electronic flash unit.

In the following there will be explained in detail the function of the first embodiment.

At first, the synchronization signal from the camera is entered through the input terminal 70 into the input circuit 50. The synchronization signal is usually in the high level state but assumes a low level state at the flash emission. At the signal level shift from high to low (at the start of flash emission from the electronic flash unit), a differentiating circuit of the input circuit 50 sends a negative pulse signal to the set input port $\bar{S}$of the voltage step-up control circuit 60, whereby the latch circuit thereof is set to turn on the output Q, thus sending the voltage step-up start signal to the control terminal 20a of the voltage step-up circuit 20 and turning on the transistor 22. As a result, the transistor 23 is turned on and the terminal voltage of the battery 10 connected to the terminals 20b, 20c is supplied, through transistor 23, to the step-up transformer 21. The transistor 23 repeats on and off by interaction with the step-up transformer 21, thereby inducing a high AC voltage at the secondary side of the step-up transformer 21. The high AC voltage is converted into a high DC voltage by a diode 24.

The elevated DC voltage charges the main capacitor of the electronic flash unit through the high-voltage output terminals 30, thereby elevating the terminal voltage of the main capacitor, which has been discharged by the flash emission. The terminal voltage of the main capacitor is supplied, through the high-voltage output terminals 30, to the voltage detecting circuit 40, which constantly monitors the terminal voltage.

Now there will be explained the function of the voltage detecting circuit 40, with reference to FIG. 3.

The voltage between the voltage detecting terminals 40a, 40b is divided by resistors 42, 43 and Zener diode 41, and a voltage thus divided is supplied to the base of a transistor 44. With the increase in the terminal voltage of the main capacitor, the voltage between the terminals 40a, 40b of the voltage detecting circuit 40 is accordingly elevated whereby the Zener diode 41 is rendered eventually conductive to turn on the transistor 44, shifting a terminal 40c of the low level state. The functioning voltage of this voltage detecting circuit 40 is determined by the resistances of the resistors 42, 43 and the Zener voltage of the Zener diode 41, and is selected equal to or slightly lower than the nominal voltage of the main capacitor of the electronic flash unit, for example as 300 V.

When voltage detecting circuit 40 detects the predetermined voltage, the terminal 40c is shifted to the low level state, whereby the reset input port $\bar{R}$of the voltage step-up control circuit 60 is also shifted to the low level state to reset the latch circuit. Thus the output Q of control circuit 60 is turned off, and a voltage step-up stop signal is entered into the control terminal 20a of the voltage step-up circuit 20 to terminate the voltage step-up operation thereof.

As explained in the foregoing, the external power source of the present invention rapidly recharges the main capacitor of the electronic flash unit in synchronization with flash emission thereof, thereby preparing for the next flash emission, and automatically terminates the voltage step-up operation simultaneously with the completion of charging, thereby avoiding unnecessary consumption of the battery 10 and thus extending the service life thereof.

Figure 5:
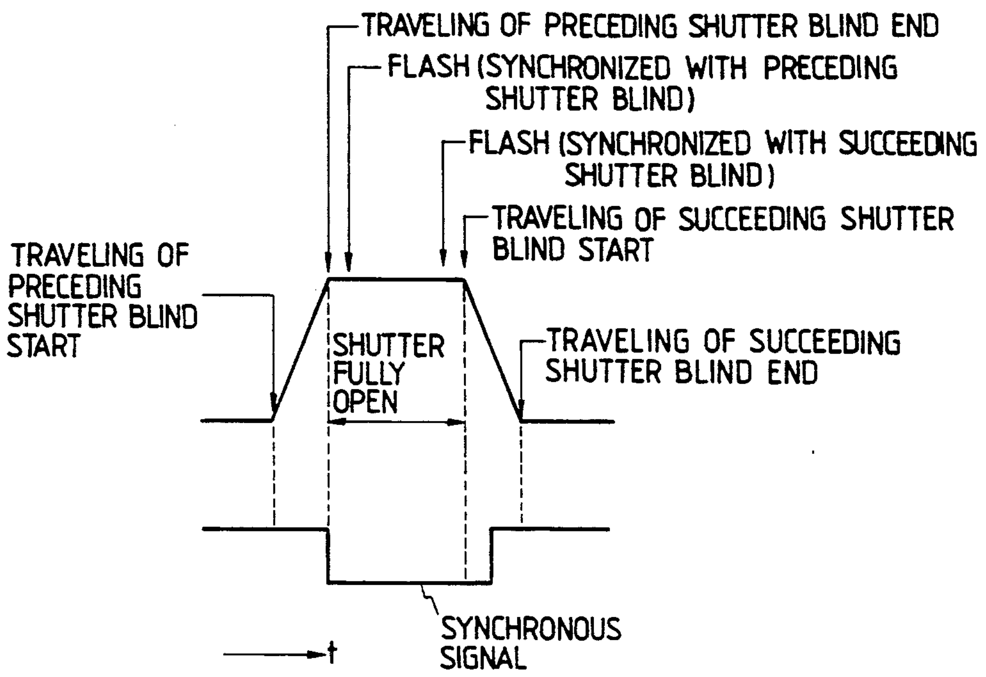
FIG. 5 is a timing chart showing the timing of running motions of shutter blinds and synchronization signals.

FIG. 5 is a timing chart showing the timing of travelling of shutter blinds of the camera and of synchronization signals. A pulse signal of a sufficient duration can be supplied to the set input port $\bar{S}$of the voltage step-up control circuit 60 by suitably selecting the resistors 51, 52 and the capacitor 53 of the input circuit 50, whereby the voltage step-up circuit 20 can be activated in synchronization with the flash emission synchronized with the leading shutter blind.

Second Embodiment

Figure 4:
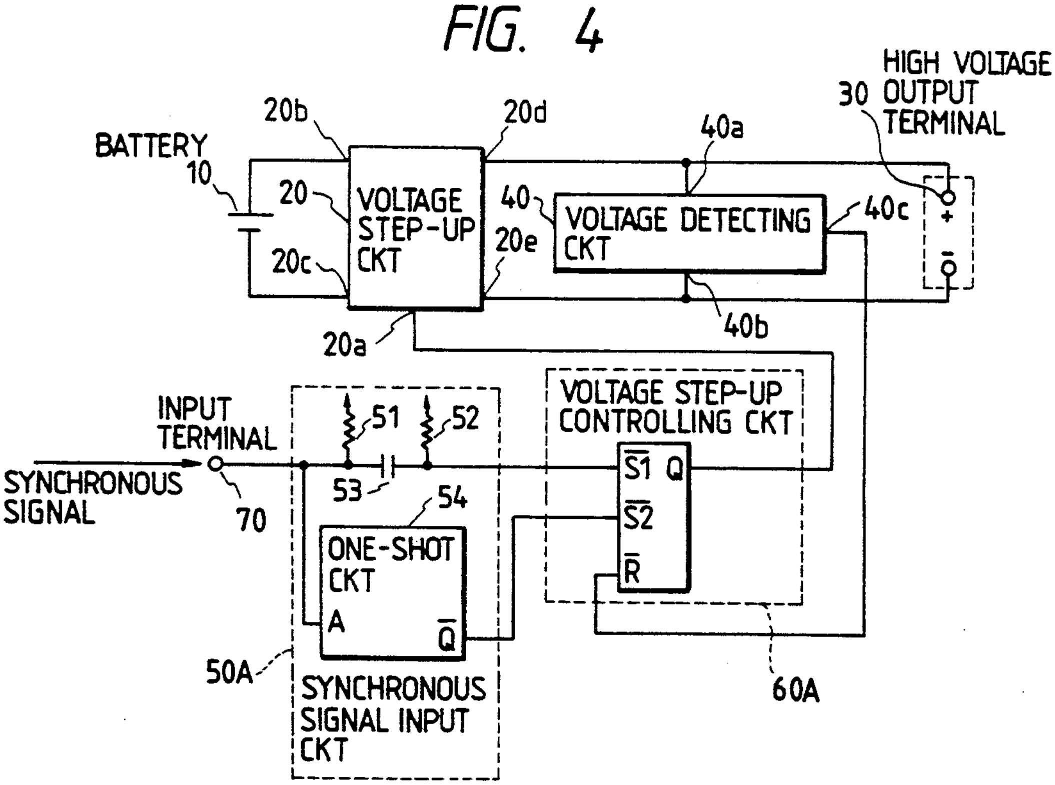
FIG. 4 is a block diagram of a second embodiment of the external power source for electronic flash, capable also of synchronizing with a trailing shutter blind synchronous signal.

FIG. 4 is a block diagram of a second embodiment, in which the voltage step-up circuit 20 can be activated in synchronization not only with the flash emission synchronized with the leading shutter blind but also with that synchronized with the trailing, shutter blind. The second embodiment is the same as the first embodiment, except that a one-shot circuit 54 is added to the synchronization signal input circuit 50A, and that the voltage step-up control circuit 60A is composed of a latch circuit having also a set input port $\overline{S}2$.

Now the function of the second embodiment will be explained with reference to FIGS. 4 and 5.

The synchronization signal from the camera is supplied, through the input terminal 70, to the synchronization signal input circuit 50, and is given to an input terminal A of the one-shot circuit 54, of which output $\overline{Q}$gives a negative pulse at the upshift edge of the signal to the input terminal A from the low level to high level. As shown in FIG. 5, the synchronization signal of the camera is shifted from the low level state to the high level state when the trailing shutter blind starts to travel immediately after the flash emission synchronized with the trailing shutter blind, and in response the output $\overline{Q}$of the one-shot circuit 54 sends a negative pulse to an input port $\overline{S}2$ of the voltage step-up control circuit 60A. In this manner the voltage step-up circuit 20 initiates the voltage step-up operation also in synchronization with the flash emission synchronized with the trailing shutter blind.

The subsequent operations to the deactivation of the voltage step-up circuit 20 are the same as those in the first embodiment. This second embodiment allows activation and deactivation of the external power source according to the necessity, also in synchronization with the flash phototaking operation synchronized with the trailing shutter blind, thereby avoiding unnecessary consumption of the battery. The flash emission synchronized with the trailing shutter curtain or blind is conducted by another synchronization signal, different from the synchronization signal synchronized with the leading shutter blind shown in FIG. 5, so that the electronic flash unit selects either signal. However, the external power source can effect the voltage step-up operation in response to the flash emission, without discriminating whether the flash is synchronized with the leading or trailing shutter blind, by initiating the voltage step-up operation also at the upshift edge of the synchronization signal of the leading shutter blind as in the second embodiment.

This second embodiment also has a circuit consisting of the resistors 51, 52 and the capacitor 53, for generating an output pulse in response to the synchronization signal of the leading shutter blind of the camera, as in the first embodiment. Consequently the voltage step-up operation is activated also at the downshift of the synchronization signal, but there is no practical drawback because the flash is not emitted in synchronization with the leading shutter blind, so that the terminal voltage of the main capacitor does not decrease and the voltage step-up operation is immediately terminated by the function of the voltage detecting circuit 40.

Third Embodiment

Figure 6:
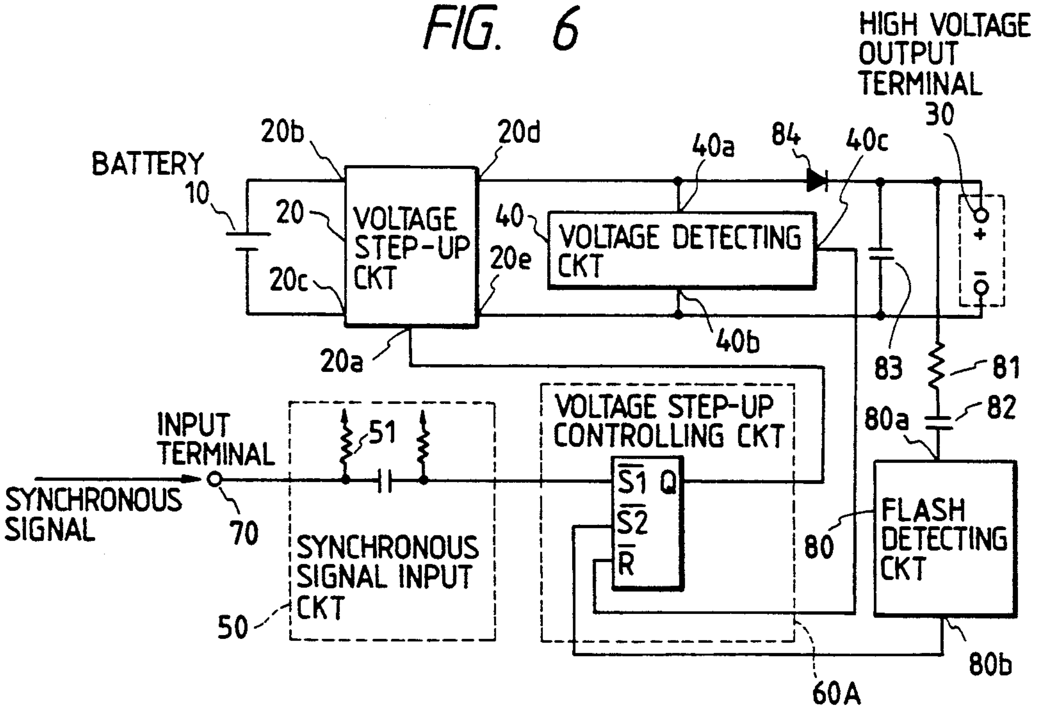
FIG. 6 is a block diagram of a third embodiment of the external power source for electronic flash, capable of functioning by detecting the flash emission of the electronic flash unit.

FIG. 6 is a block diagram of a third embodiment of the external power source of the present invention, for electronic flash unit.

In comparison with the first embodiment, it additionally contains a flash detecting circuit 80 for detecting the flash emission from the electronic flash unit, a serial circuit of a resistor 81 and a capacitor 82, a voltage holding capacitor 83, and a diode 84 for preventing the discharge of capacitor 83 through the voltage detecting circuit 40, and is different in that the voltage step-up control circuit 60A is composed of a latch circuit having an additional set input port $\overline{S}2$.

Figure 7:
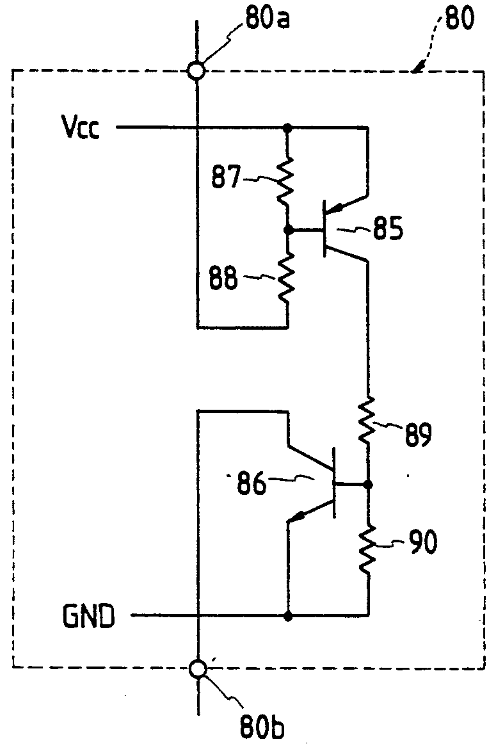
FIG. 7 is a detailed circuit diagram of a flash detecting circuit thereof.

FIG. 7 shows the details of the flash detecting circuit 80.

The circuit 80 is composed of a PNP transistor 85, an NPN transistor 86, and resistors 87, 88, 89, 90. When the voltage of an input terminal 80*a* is lowered by the flash emission, the transistor 85 is turned on to turn on the transistor 86, thereby shifting the output terminal 80*b* to a low level state, and input terminal 80*a* and output terminal 80*b* are respectively connected to the capacitor 82 and a reset input port $\overline{R}$of the voltage step-up control circuit 60A.

In the following there will be explained the function of the third embodiment with reference to FIGS. 6 and 7.

In the third embodiment, the voltage control circuit 60A for starting the voltage step-up operation has two set input ports $\overline{S}1$ and $\overline{S}2$, and the voltage step-up starting operation by the synchronization signal entered to the port $\overline{S}1$ is the same as that explained in the first embodiment. In the following explained is the voltage step-up operation conducted through the port $\overline{S}2$.

The voltage-holding capacitor 83 is connected between the high-voltage output terminals 30, and is discharged simultaneous with the discharge of the main capacitor connected to terminals 30 at the flash emission, thus showing a rapid decrease in the terminal voltage. The flash detecting circuit 80 is connected to the + terminal of the high-voltage output terminals 30 through a serial connection of the resistor 81 and the capacitor 82 and is given a signal only in case of a voltage change in high-voltage output terminals 30. Thus the flash emission of the electronic flash unit is detected by a rapid voltage decrease at the high-voltage output terminals 30.

Referring to FIG. 7, when a voltage decrease signal is supplied to the input terminal 80*a*, the potential thereof is lowered whereby a base current of the transistor 85 starts to flow through the resistor 88 to turn on transistor 85. The collector current of transistor 85 drives the base of the transistor 86, thereby turning on the transistor 86. In this manner, the flash emission reduces the terminal voltage of the main capacitor, and voltage decrease is detected by the flash detecting circuit 80 to shift the set input port $\overline{S}2$ of the voltage step-up control circuit 60A to a low level state. As a result, the output Q of control circuit 60A is turned on to release the start signal, thereby starting the voltage step-up operation in the circuit 20.

In this third embodiment, as explained in the foregoing, the voltage step-up operation is started either by a synchronization signal supplied from the camera or by a flash emission of the flash unit. For example in case of tracking the movement of the object by repeated flashes during a prolonged exposure, the voltage step-up operation can be started in response to each flash emission to charge the main capacitor of the electronic flash unit even if the synchronization signal from the camera remains in the low level state.

Also in this third embodiment, the process of automatically terminating the voltage step-up operation by the function of the voltage detecting circuit 40 when the terminal voltage of the main capacitor reaches a predetermined value in the course of voltage step-up operation is the same as that in the first embodiment, and will not, therefore, be explained again.

Fourth Embodiment

Figure 8:
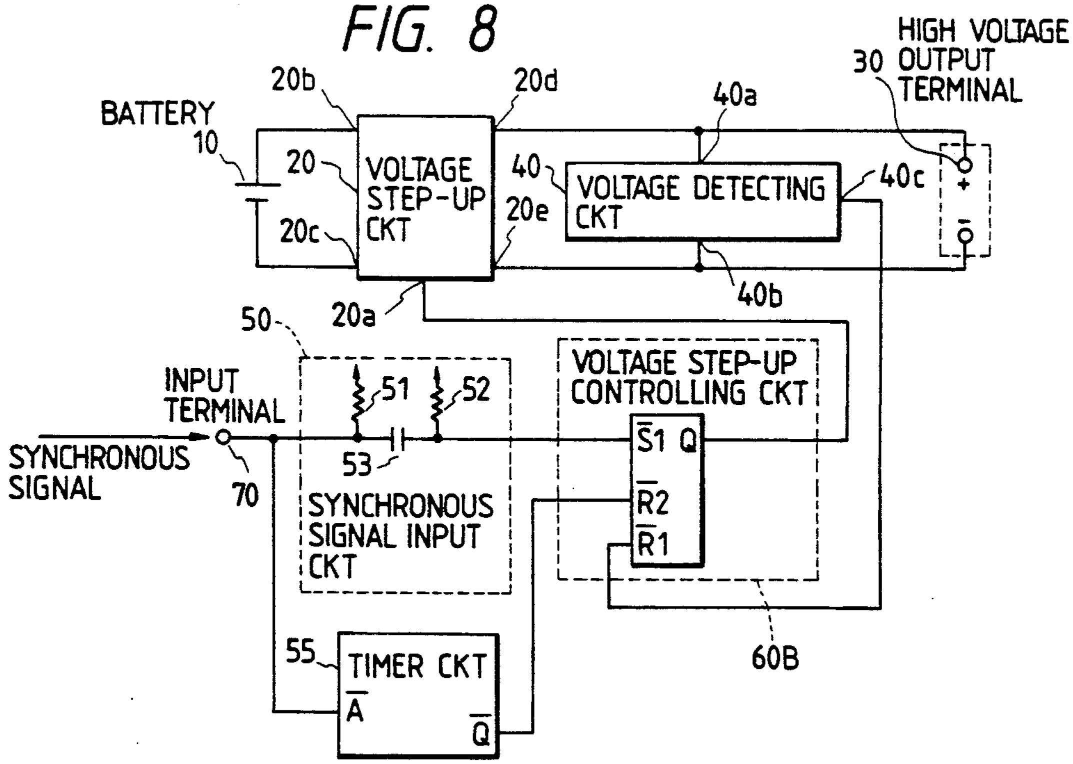
FIG. 8 is a block diagram of a fourth embodiment of the external power source for electronic flash, capable of preventing overdischarge of the battery.

FIG. 8 is a block diagram of a fourth embodiment, which is different from the first embodiment in the addition of a timer circuit 55 and that the voltage step-up control circuit 60B is composed of a latch circuit having also a reset input port $\overline{R2}$.

In the fourth embodiment, as in the first embodiment, the voltage-step-up operation is started in response to the synchronization signal from the camera, and is automatically terminated when the voltage of the main capacitor of the electronic flash unit reaches a predetermined value. It is also automatically terminated after the lapse of a predetermined time from the downshift of the synchronization signal entered from the camera.

When the synchronization signal from the camera is shifted down, the input circuit 50 drives the voltage step-up control circuit 60B as explained above, thereby activating the voltage step-up circuit 20. The synchronization signal is also supplied to the timer circuit 55 to start the time measuring operation thereof. After the lapse of a predetermined time, the output $\overline{Q}$thereof is shifted to the low level state, thus sending a reset signal to the reset input port $\overline{R2}$ of the voltage step-up control circuit 60B. In response the output $\overline{Q}$thereof is turned off to release the stop signal, thus terminating the voltage step-up operation of the circuit 20.

The timer circuit 55 is set for example at 30 seconds, and forcedly terminates the voltage step-up operation for example in case the output of the voltage step-up circuit 20 does not reach the detecting voltage of the detecting circuit 40 due to the fatigue of the battery 10, thus avoiding unnecessary consumption of the power thereof. This embodiment is particularly effective for preventing the deterioration of battery resulting from overdischarge, in case of using a rechargeable battery.

Fifth Embodiment

Figure 9:
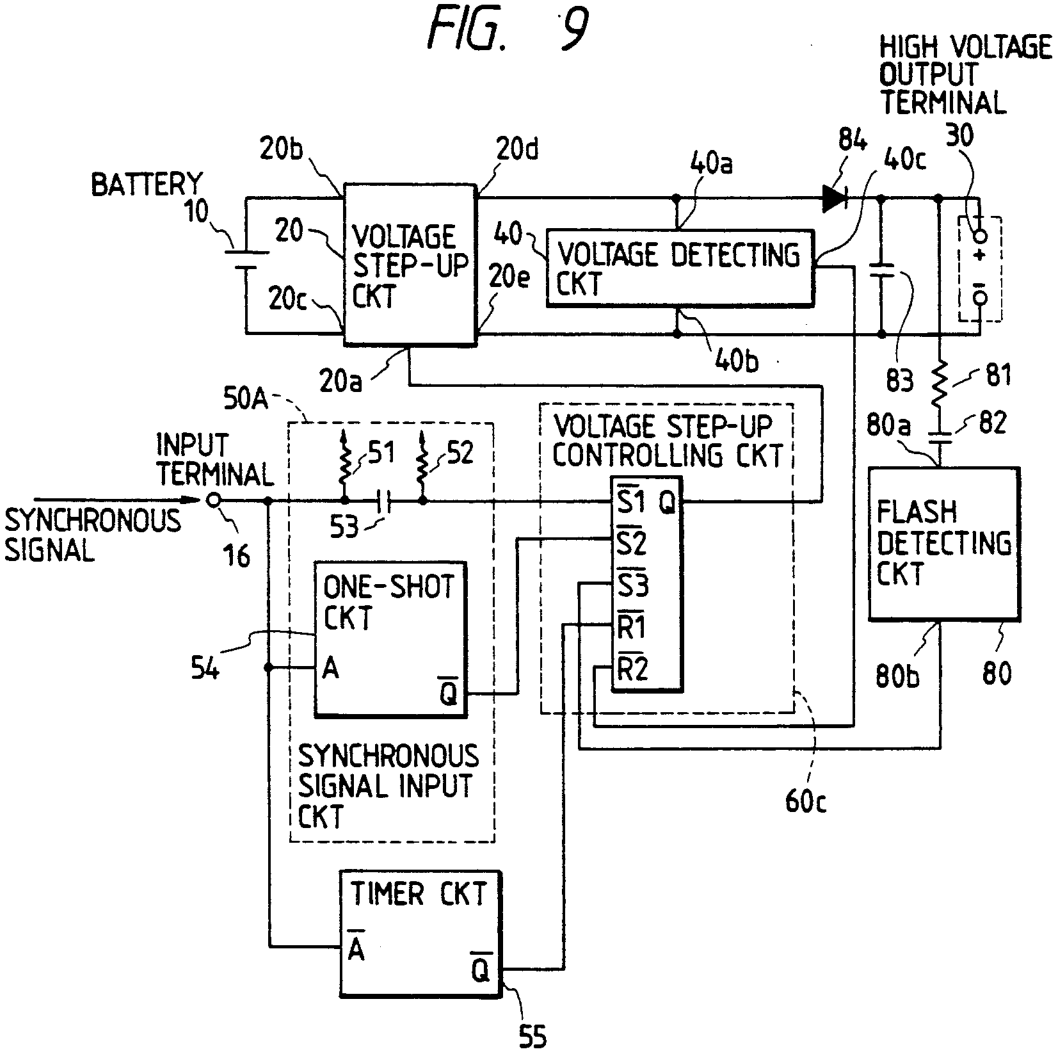
FIG. 9 is a block diagram of a fifth embodiment.

FIG. 9 is a block diagram of a fifth embodiment, including all the structures of the foregoing first to fourth embodiments and employing a latch circuit, having also a set input port $\overline{S3}$ as the voltage step-up control circuit 60C. Thus, in this embodiment, for initiating the voltage step-up operation, there are provided a synchronization signal input circuit 50A for responding to the leading shutter blind synchronization signal, a one-shot circuit 54 for responding to the trailing shutter blind synchronization signal, and a flash detecting circuit 80 for detecting the flash emission, and, for terminating the voltage step-up operation, there are provided a timer circuit 55 for preventing the overdischarge of the battery 10 and a voltage detecting circuit 40 for detecting that the terminal voltage of the main capacitor of the flash unit has reached a predetermined value. These circuits will not be explained further as they were already explained in the first to fourth embodiments. These circuits can function satisfactorily without mutual contradiction when combined as in the present embodiment, thus starting the voltage step-up operation according to various modes of use of the electronic flash unit and terminating operation after the charging of the main capacitor in automatic manner thereby preventing the unnecessary consumption of the battery.

In the foregoing first to fifth embodiments, the battery 10 constitutes the battery means; the voltage step-up circuit 20 constitutes the voltage step-up means; the voltage detecting circuit 40 constitutes the voltage detecting means; the voltage step-up control circuit 60, 60A, 60B or 60C constitutes the voltage step-up control means; and the resistor 81, capacitors 82, 83, diode 84 and flash detecting circuit 80 constitute the flash detecting means.

Furthermore, the voltage detecting circuit and the voltage step-up control circuit which are continuously powered may be composed of CMOS devices to further reduce the electric power consumption, whereby an external power source of simple operation without a power switch may be provided.

What is claimed is:

1. An external power source to be detachably connected to an electronic flash unit which has a main capacitor for storing charge therein and flash means for emitting light on the basis of charge stored in said main capacitor, comprising:
   - a battery;
   - voltage step-up means for elevating voltage from said battery to apply the elevated voltage to said main capacitor;
   - flash detecting means for detecting flash emission of said flash means and producing a flash detection signal;
   - voltage detecting means for detecting that the output voltage of said voltage step-up means has reached a predetermined value and producing a voltage detection signal; and
   - voltage step-up control means for releasing a start signal in response to said flash detection signal, and releasing a stop signal in response to said voltage detection signal, said voltage step-up means starting a voltage step-up operation for elevating the voltage of said battery in response to said start signal and terminating said step-up operation in response to said stop signal.

2. An external power source according to claim 1, wherein said flash detecting means detects flash emission of said flash means irrespective of a shutter operation of said camera.

3. An external power source according to claim 2, wherein said voltage step-up means comprises output terminals for applying the elevated voltage to said main capacitor, and wherein said flash detecting means comprises a detecting capacitor electrically connected to said output terminals and detects that the voltage of said detecting capacitor decreases and thereafter produces said flash detection signal.

4. An external power source according to claim 3, wherein said flash detecting means comprises a detecting transistor provided with an emitter terminal and a base terminal, said emitter terminal being connected to one of said output terminals, and said base terminal being connected to a power source line.

5. An external power source according to claim 3, which further comprises timer means for counting time in response to a synchronization signal for flash emission supplied from a camera and producing a timer signal when said timer means has counted a predetermined time, wherein said voltage step-up control means releases said stop signal in response to said timer signal.

6. An external power source according to claim 1, which further comprises timer means for counting time in response to a synchronization signal for flash emission supplied from a camera and producing a timer signal when said timer means has counted a predetermined time, wherein said voltage step-up control means releases said stop signal in response to said timer signal.

* * * * *